(12) United States Patent
Kurachi (10) Patent No.: US 12,102,110 B2
(45) Date of Patent: Oct. 1, 2024

(54) POWDER SUPPLY APPARATUS

(71) Applicant: YUTAKA MFG. CO., LTD., Kounan (JP)

(72) Inventor: Masayasu Kurachi, Kounan (JP)

(73) Assignee: YUTAKA MFG. CO., LTD., Kounan (JP)

(*) Notice: Subject to any disclaimer, the term of this patent is extended or adjusted under 35 U.S.C. 154(b) by 221 days.

(21) Appl. No.: 17/815,664

(22) Filed: Jul. 28, 2022

(65) Prior Publication Data

US 2023/0029502 A1 Feb. 2, 2023

(30) Foreign Application Priority Data

Aug. 2, 2021 (JP) ................................ 2021-126611

(51) Int. Cl.
*B05B 7/14* (2006.01)
*A21C 9/04* (2006.01)
*A23P 20/12* (2016.01)

(52) U.S. Cl.
CPC ................ *A23P 20/12* (2016.08); *A21C 9/04* (2013.01); *B05B 7/144* (2013.01)

(58) Field of Classification Search
CPC ......... B05B 7/10; B05B 7/1404; B05B 7/144; B05B 7/1472; B05B 7/1486; A23P 20/12; A21C 9/04
USPC ........... 118/308, 313; 222/61, 412, 195, 135
See application file for complete search history.

(56) References Cited

U.S. PATENT DOCUMENTS

| 2,096,026 A | * | 10/1937 | Belluche | .................. B41G 1/00 |
| | | | | 118/308 |
| 3,878,815 A | * | 4/1975 | Gorius | ................ B28B 19/0023 |
| | | | | 118/313 |
| 3,907,170 A | * | 9/1975 | Schedrin | ............... B05B 7/1431 |
| | | | | 118/308 |

(Continued)

FOREIGN PATENT DOCUMENTS

| JP | S55-55581 Y2 | 12/1980 |
| JP | H03-73525 U | 7/1991 |

(Continued)

OTHER PUBLICATIONS

Notice of Reasons for Refusal, dated Jul. 29, 2022, corresponding to Japanese Patent Application No. 2021-126611.

*Primary Examiner* — Charles P. Cheyney
(74) *Attorney, Agent, or Firm* — LADAS & PARRY LLP; Malcolm J. MacDonald, Esq.

(57) ABSTRACT

A powder supply apparatus, comprising a powder receiving device which receives powder, a hopper for storing powder that has an outlet at the bottom thereof, a screw feeder which is provided at the outlet of the hopper, has an extrusion port, and pushes the powder received from the outlet of the hopper toward the extrusion port by a screw. The powder supply apparatus also has a diaphragm pump having a suction port and a discharge port, and discharges air sucked from the suction port to the discharge port by an operation of a diaphragm. An atmospheric passage communicates the suction port of the diaphragm pump with the atmosphere. A communicating passage communicates the discharge port of the diaphragm pump with the powder receiving device. The extrusion port of the screw feeder is positioned within the atmospheric passage so as to supply the powder to the atmospheric passage.

5 Claims, 11 Drawing Sheets

(56) References Cited

U.S. PATENT DOCUMENTS

| | | | | |
|---|---|---|---|---|
| 4,632,284 | A * | 12/1986 | Erazo | A01C 1/046 |
| | | | | 222/413 |
| 5,017,324 | A * | 5/1991 | Kaiser | A61F 13/1565 |
| | | | | 264/510 |
| 5,240,185 | A * | 8/1993 | Kaiju | B05B 7/144 |
| | | | | 239/690 |
| 5,662,272 | A * | 9/1997 | Buquet | B05B 7/144 |
| | | | | 239/654 |
| 6,220,486 | B1 * | 4/2001 | Teramachi | B05B 7/144 |
| | | | | 222/240 |
| 6,474,398 | B1 * | 11/2002 | Schoner | B22D 11/108 |
| | | | | 118/308 |
| 7,527,823 | B2 * | 5/2009 | Tombult-Meyer | B05B 12/06 |
| | | | | 427/197 |
| 7,827,929 | B2 * | 11/2010 | Garrison | B05B 7/10 |
| | | | | 118/313 |
| 9,845,206 | B1 * | 12/2017 | Baranovski | B05B 7/144 |
| 2003/0190200 | A1 * | 10/2003 | Hajima | B05B 7/1472 |
| | | | | 406/191 |
| 2004/0137144 | A1 * | 7/2004 | Shutic | B05B 7/1472 |
| | | | | 118/308 |
| 2006/0185586 | A1 * | 8/2006 | Durr | B05B 7/1459 |
| | | | | 118/308 |
| 2008/0203184 | A1 * | 8/2008 | Garrison | B05B 7/1486 |
| | | | | 239/8 |

FOREIGN PATENT DOCUMENTS

| | | |
|---|---|---|
| JP | H04-99224 U | 8/1992 |
| JP | 2002-96931 A | 4/2002 |
| JP | 2002-154652 A | 5/2002 |
| JP | 2012-210996 A | 11/2012 |

* cited by examiner

POWDER SUPPLY APPARATUS

CROSS-REFERENCE TO RELATED APPLICATIONS

This application claims priority to Japanese patent application serial number 2021-126611, filed Aug. 2, 2021, the content of which is incorporated herein by reference in its entirety for all purposes.

BACKGROUND

The present invention relates to a powder supply apparatus.

In the production of noodles, such as udon noodles or soba noodles, or skins, such as dumpling skins or wonton skins, a dusting powder sprinkling device is used to sprinkle flour on the surface of the material. In some powder supply apparatuses, a powder sprinkling device is used to automatically supply dusting powder. Usually, a powder supply apparatus is configured to supply dusting powder to multiple powder sprinkling devices.

Some powder supply apparatuses are provided with a screw feeder to lift a dusting powder stored in a hopper to a position higher than the powder receiving port of the powder sprinkling device. The power supply apparatuses may also sprinkle the dusting powder via a hose.

As another powder material transporting device, there is also a device that generates an air flow in a flow passage, introduces the powder to the air flow, and transports the powder to the destination.

SUMMARY

One aspect of the present disclosure is a powder supply apparatus including a powder receiving device which receives powder. The powder supply apparatus also includes a hopper, a screw feeder, a diaphragm pump, an atmospheric passage, and a communicating passage. The hopper may store the powder and have an outlet at the bottom thereof. The screw feeder may be provided at the outlet of the hopper and have an extrusion port. The screw feeder is configured to push the powder received from the outlet of the hopper toward the extrusion port by a screw provided in the screw feeder. The diaphragm pump may have a suction port and a discharge port. The diaphragm pump discharges air sucked from the suction port to the discharge port by the operation of a diaphragm. The atmospheric passage may communicate the suction port of the diaphragm pump with the atmosphere. The communicating passage may communicate the discharge port of the diaphragm pump with the powder receiving device. The extrusion port of the screw feeder may be positioned within the atmospheric passage so as to supply the powder to the atmospheric passage.

According to the above aspect, the powder extruded by the screw feeder is supplied to the powder receiving device, via the communicating passage, by the air pressure generated by the diaphragm pump. Therefore, the screw feeder, which is used to extrude the powder, only needs to extrude the powder in the hopper to the atmospheric passage. Therefore, the path from the discharge port of the diaphragm pump to the powder receiving device may be a simple configuration, such as being formed of only the communicating passage for supplying the powder.

DETAILED DESCRIPTION

A conventional powder supply apparatus, which supplies dusting powder to a powder sprinkling device using a screw feeder, has a large outer diameter and a large height for the screw feeder. Therefore, there is a problem that it takes a lot of labor to relocate the powder supply apparatus when changing the equipment layout.

One aspect of the present disclosure is to enable a powder supply apparatus that supplies powder to a powder receiving device, such as a powder sprinkling device, to supply the powder to the powder receiving device by pressurizing the powder toward the powder receiving device. This may be done with a simple configuration that only requires a passage for the powder and air to pass between the powder supply apparatus and the powder receiving device.

Figure 1:
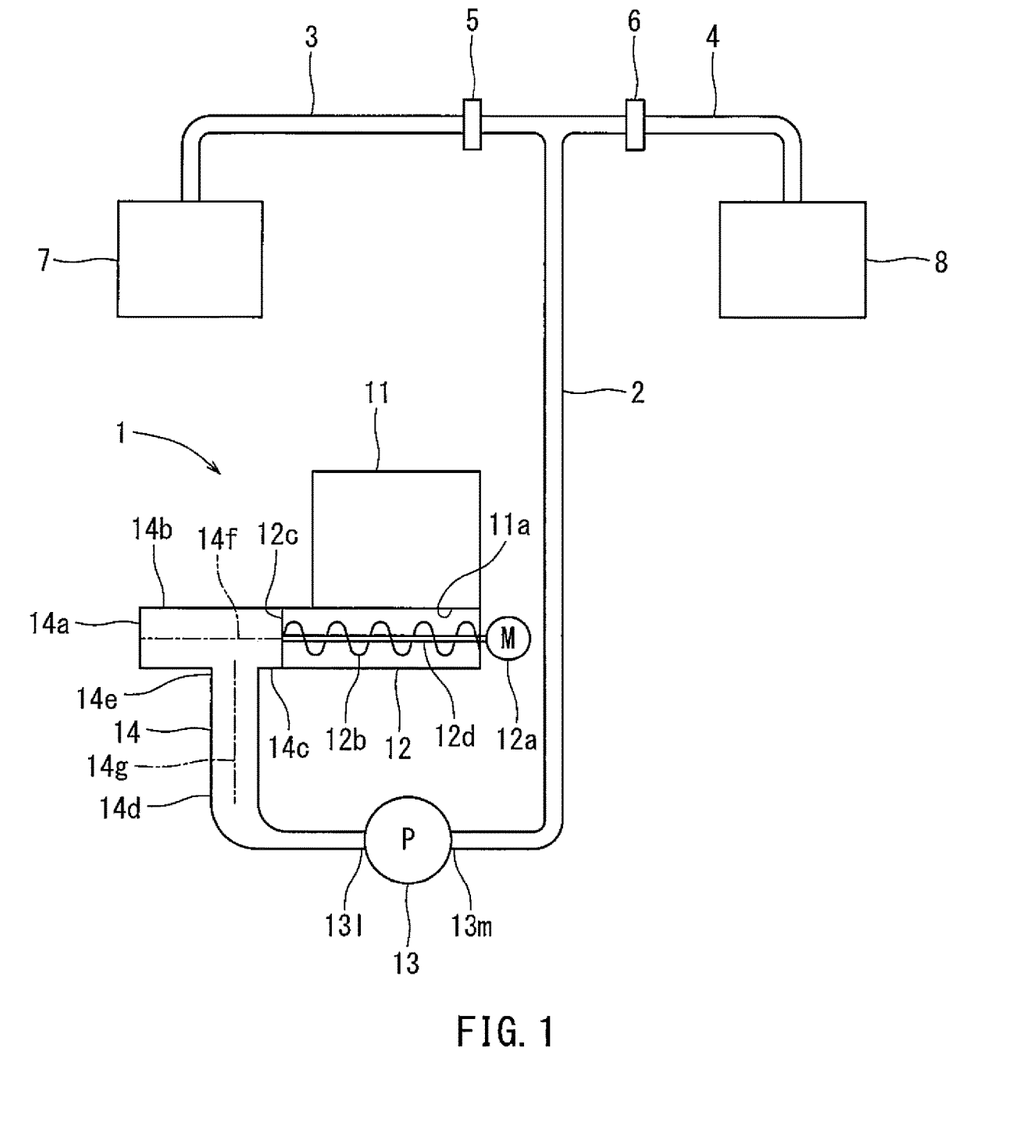
FIG. 1 is a schematic diagram of a first embodiment.

FIG. 1 is a schematic diagram of a first embodiment of the present disclosure. A powder feeder 1, which is a main part of a powder supply apparatus, is configured to supply powder, such as starch, to two powder sprinkling devices 7, 8 (which corresponds to an embodiment of a powder receiving device of the present disclosure) via communicating passages 2, 3, 4. The powder sprinkling devices 7, 8 are, for example, for a noodle-making device (not shown) and are configured to spread powder on the surface of noodles or the like. One of the powder sprinkling devices 7, 8 may sprinkle powder on the surface of a conveyor conveying noodles. The other one of the powder sprinkling devices 7, 8 may sprinkle powder on the surface of noodles after they have been placed on the powdered conveyor.

Powder sprinkling devices 7, 8 are provided with a hopper that contains powder inside thereof. The capacity of the hopper may be the amount of powder that is consumed in a short time of spreading (e.g., 5 to 10 minutes). The powder feeder 1 is configured to supply powder to the powder sprinkling devices 7, 8. Powder from the powder feeder 1 may pass through the communicating passage 2, branch into communicating passages 3, 4, and then be supplied to the powder sprinkling devices 7, 8, in this order. Butterfly valves 5, 6 (which may correspond to an embodiment of open/close valves of the present disclosure) are inserted in the communicating passages 3, 4. The butterfly valves 5, 6 enable the powder supplied to the powder sprinkling devices 7, 8 to be individually supplied or stopped.

The powder feeder 1 is provided with a hopper 11, a screw feeder 12, a diaphragm pump 13, and an atmospheric passage 14. The hopper 11 may store powder. The screw feeder 12 receives the powder via an outlet 11a of the hopper 11 and extrudes the powder to an extrusion port 12c. The diaphragm pump 13 sucks the powder extruded by the screw feeder 12 via the suction port 131 and discharges it from a discharge port 13m by air pressure. The atmospheric passage 14 is configured to supply air to the diaphragm pump 13, together with powder extruded from the screw feeder 12. The screw feeder 12 may include a screw 12b that rotates around a rotation shaft 12d by a screw feeder driving motor 12a (hereinafter, referred to as a motor). The screw 12b is configured to extrude the powder toward the extrusion port 12c.

The atmospheric passage 14 may have a first passage 14b leading to an atmospheric port 14a, a second passage 14c leading to the extrusion port 12c of the screw feeder 12, and a third passage 14d leading to a suction port 131 of the diaphragm pump 13. The first passage 14b, the second passage 14c, and the third passage 14d are connected at a connecting portion 14e, so that each passage is in communication with the others. At the connecting portion 14e, the first passage 14b and the second passage 14c are connected so that their passage central axes 14f are aligned with each other. At the connecting portion 14e, a passage central axis 14g of the third passage 14d intersects the passage central axis 14f of both the first and second passages 14b, 14c. Each passage central axis 14f, 14g passes through the center of the cross-section of the flow when air and/or powder flows through the first passage 14b, the second passage 14c, and/or the third passage 14d.

When the diaphragm pump 13 is activated, air is sucked into the suction port 131 from the atmospheric port 14a of the first passage 14b. At the same time, when the screw feeder 12 is activated, the powder extruded from the extrusion port 12c is supplied into the second passage 14c. The length of the second passage 14c in the direction of the passage central axis 14f is short, thereby the powder supplied to the second passage 14c is placed close to the connecting portion 14e. Therefore, the powder supplied to the second passage 14c is exposed to the air flow flowing from the first passage 14b to the third passage 14d via the connecting portion 14e. This supplied powder is sucked into the suction port 131 together with the air flow, and is then carried from the discharge port 13m to the communicating passage 2.

Figure 2:
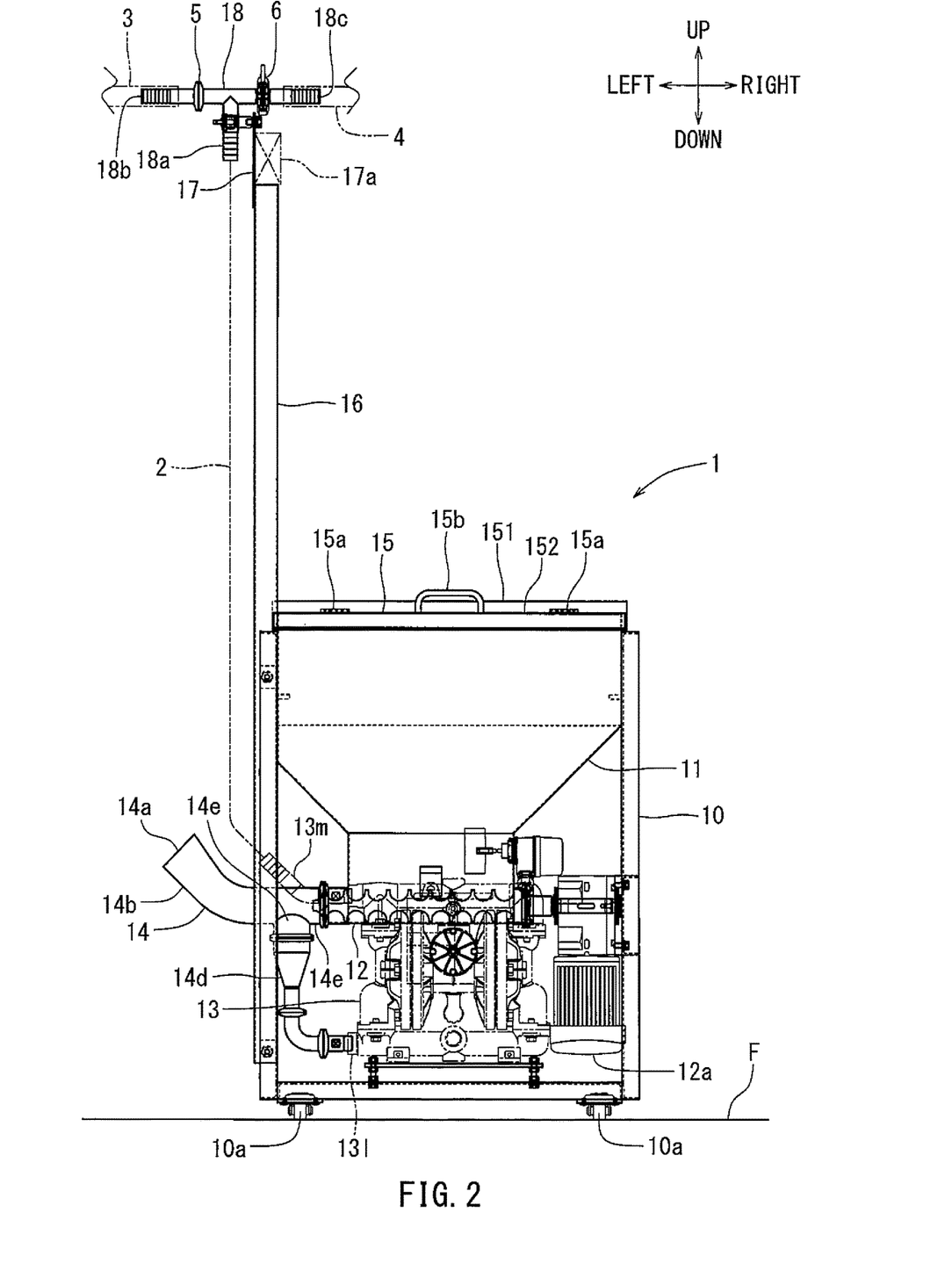
FIG. 2 is a rear perspective view of the first embodiment.
Figure 3:
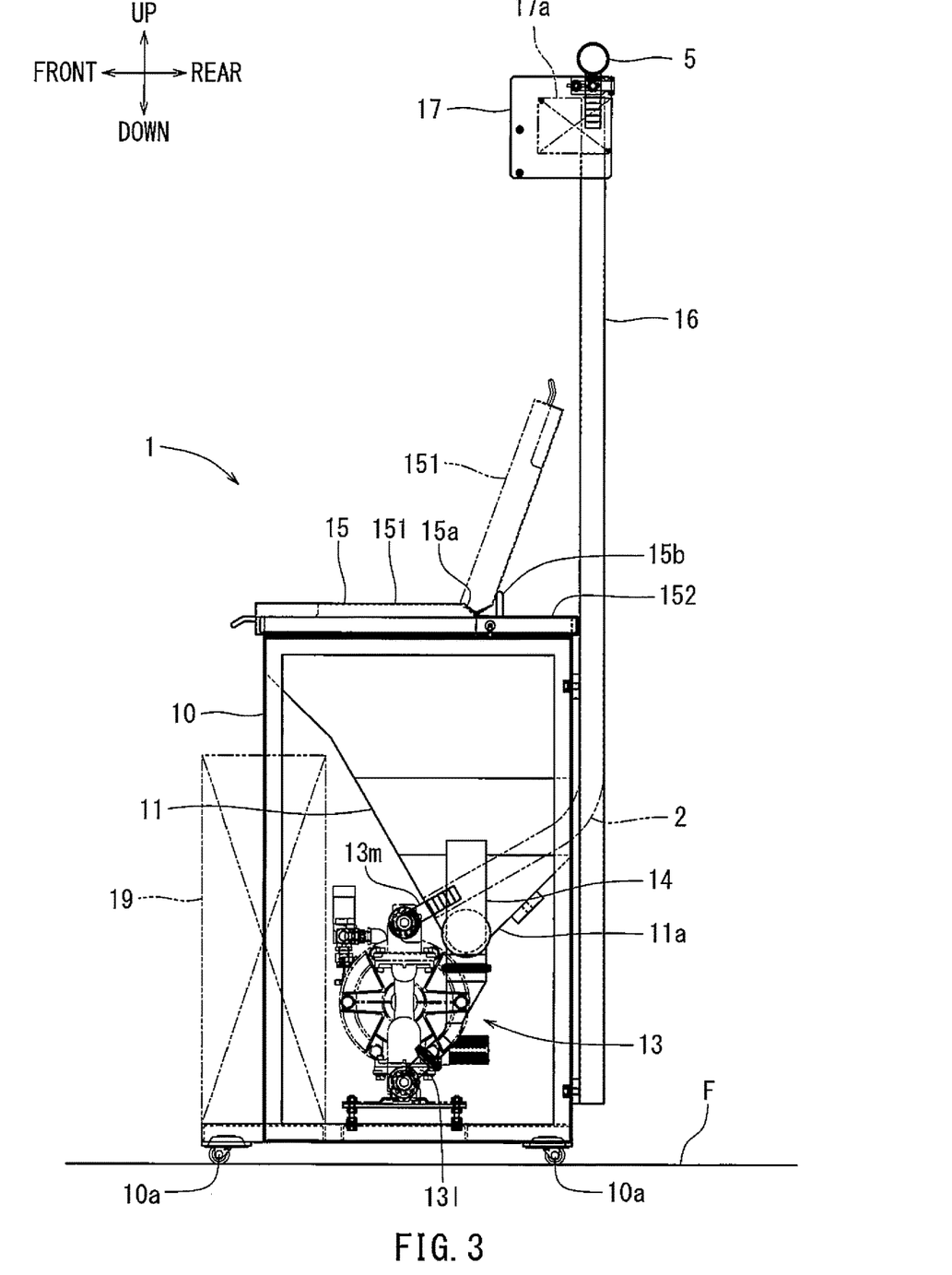
FIG. 3 is a left side view of the first embodiment.
Figure 4:
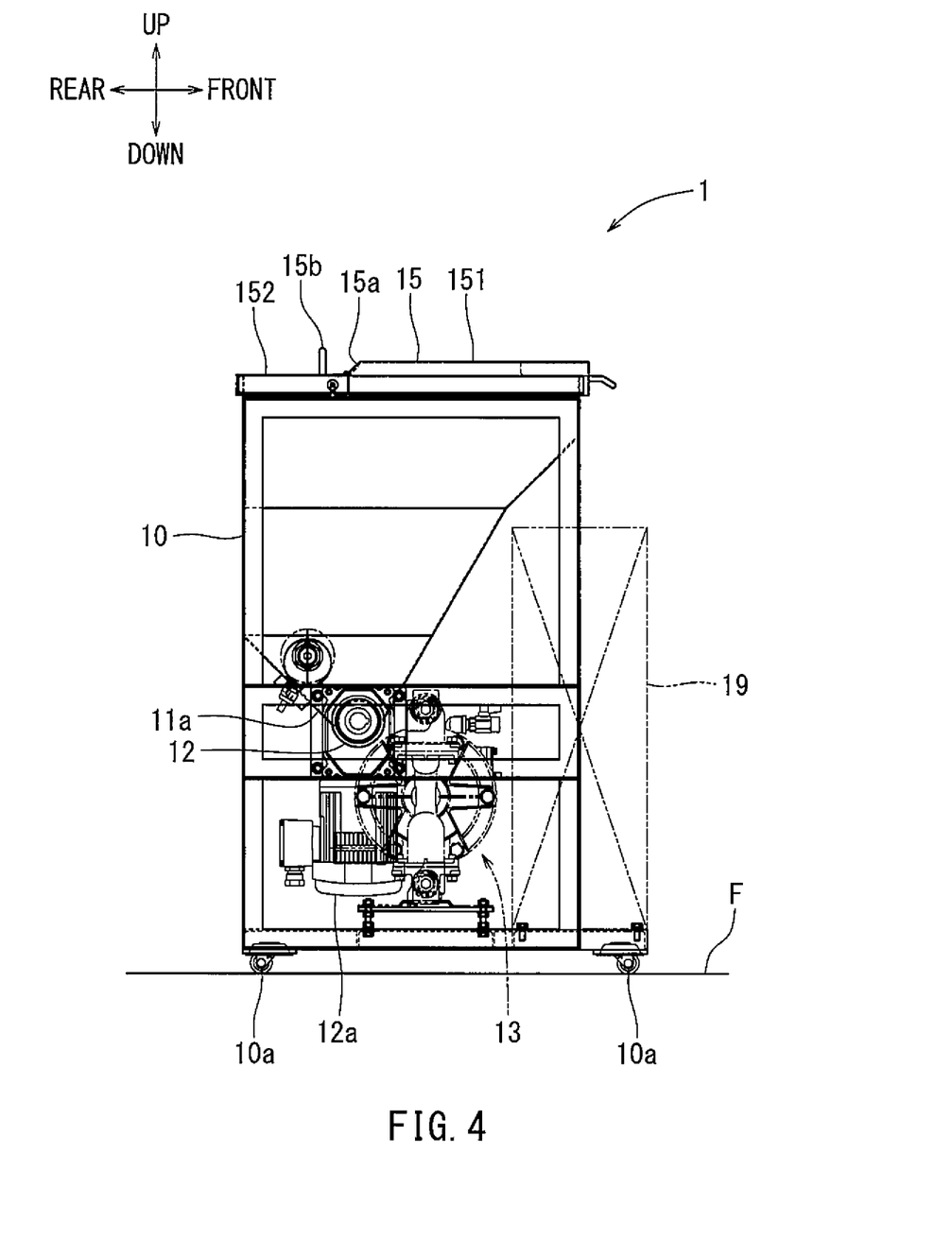
FIG. 4 is a right side view of the first embodiment.

Now, a specific configuration of the first embodiment will be described. FIGS. 2-4 show specific examples of a powder feeder 1 of the present disclosure. In FIGS. 2-4, the front side of the powder feeder 1, when the powder feeder 1 is placed on a floor F, is defined as the "front", and each direction is indicated by arrows. The descriptions of the directions shall be based on these illustrated directions.

The powder feeder 1 is configured to move freely on the floor F by means of four casters 10a. A housing 10 is configured as a six-sided frame structure made of, for example, stainless steel. The left and right sides of the housing 10 are not provided with walls, thereby allowing the inside to be kept open. The hopper 11 is made of, for example, stainless steel. The hopper 11 is formed in an inverted square pyramid shape, with its width narrowed toward the lower side. The lower side of the hopper 11 is formed with an outlet 11a, and the hopper 11 is fixed to the inside of the upper part of the housing 10. A screw feeder 12 is provided below the hopper 11, the screw feeder 12 being integrally coupled thereon. The screw feeder 12 is made of, for example, stainless steel. A diaphragm pump 13 made of, for example, stainless steel is provided in the lower front portion of the screw feeder 12. The diaphragm pump 13 may be a known high-concentration fluid transport pump, and may be configured by combining a pair of diaphragm pumps (not shown). The diaphragm pump 13 has a suction port 131 at the lower part and has the discharge port 13m at the upper part. The atmospheric passage 14 is made of, for example, stainless steel. The end of the first passage 14b (which may be on an opposite side of the connecting portion 14e) is arranged so as to project to the outside of the housing 10. The second passage 14c of the atmospheric passage 14 has a passage diameter that matches the inner diameter of the extrusion port 12c of the screw feeder 12. The third passage 14d of the air passage 14 has a passage diameter that matches the inner diameter of the suction port 131. The inner diameter of the extrusion port 12c is larger than the inner diameter of the suction port 131. At the connecting portion 14e, the passage diameter of the third passage 14d is equal to the passage diameter of the second passage 14c. Therefore, in the third passage 14d, the diameter of the passage gradually decreases as the distance from the connecting portion 14e to the suction port 131 side decreases. Further, the first passage 14b is formed by gradually decreasing the passage diameter from the atmospheric port 14a side to the connecting portion 14e and by bending it upward. The atmospheric port 14a of the first passage 14b is opened upward.

The hopper 11 is covered with a lid 15 from above. The lid 15 is divided into two parts in the front-rear direction (e.g., a front lid 151 and a rear lid 152), and the two parts are connected so as to be relatively rotatable by a pair of left and right hinges 15a. Therefore, the front lid 151 can rotate about the hinge 15a with respect to the rear lid 152. By opening and closing either of the front or rear lids 151, 152, the upper portion of the hopper 11 may be partially opened and closed. A stopper 15b is provided at the center portion of the lid 15 in the left-right direction and is provided on an upper surface of the rear lid 152, a portion which may be fixed on the hopper 11. The stopper 15b may also serve as a gripping portion when lifting the lid 15. When the front lid 151 is rotated upward to open the upper part of the hopper 11, a part of the front lid 151 comes into contact with the upper portion of the stopper 15b. Thereby, the lid body 15 can be held in its opened position (e.g., see FIG. 3).

A support column 16 is fixed to the rear end of the housing 10. The support column 16 is made of, for example, stainless steel. An upper end of the support column 16 is higher than the powder sprinkling devices 7, 8. A support bracket 17 is fixed to the upper end of the support column 16. The support bracket 17 is made of, for example, stainless steel. A branch path 18 is formed in substantially a T-shape and is fixed to the support bracket 17. The branch path 18 is made of, for example, stainless steel. A connector box 17a for electrical wiring is fixed to the support bracket 17. The connector box 17a is made of, for example, resin. The branch path 18 may include a first socket 18a extending downward, and a second socket 18b and a third socket 18c extending in the left-right direction. One end of the communicating passage 2 is connected to the first socket 18a. The other end of the communicating passage 2 is connected to the discharge port 13m of the diaphragm pump 13. One end of the communicating passage 3 is connected to the second socket 18b. The other end of the passage 3 is connected to the powder sprinkling device 7. One end of the communicating passage 4 is connected to the third socket 18c. The other end of the communicating passage 4 is connected to the powder sprinkling device 8. Further, butterfly valves 5, 6 are interposed in the branch path 18 in the vicinity of the second socket 18b and the third socket 18c, respectively. In FIG. 4, the depiction of the support column 16 is omitted.

A control panel 19 is provided on the front side of the powder feeder 1. A part of the control panel 19 is embedded in the housing 10. The control panel 19 may include a control circuit 20 for controlling the operation of the diaphragm pump 13, the motor 12a, and the butterfly valves 5, 6.

Figure 5:
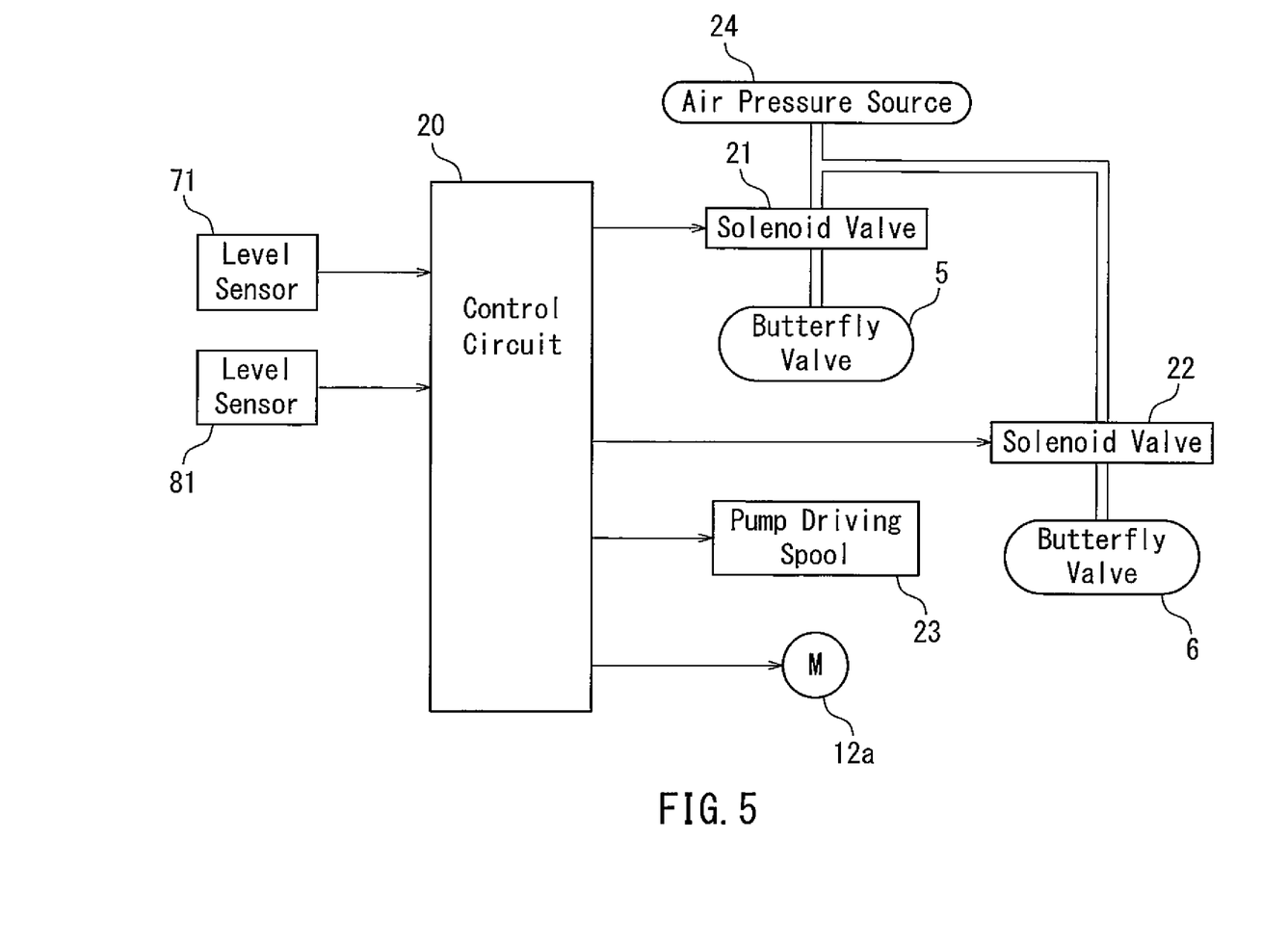
FIG. 5 is a system configuration of a control unit of the first embodiment.

Now, a configuration of a control system of a first embodiment will be described. FIG. 5 shows a system configuration of the powder supply apparatus. The control circuit 20 may include a digital computer. Level sensors 71, 81 detect the remaining amount of powder in the hoppers of the powder sprinkling devices 7, 8 (not shown). The level sensors 71, 81 output a detection signal when the remaining amount of powder becomes less than a set amount. The detection signals detected by the level sensors 71, 81 are input to the control circuit 20. Various known sensors may be used as the level sensors 71, 81. The control circuit 20 outputs a signal to open and/or close solenoid valves 21, 22. Solenoid valves 21, 22 are interposed in a passage that supplies compressed air from an air pressure source 24 to butterfly valves 5, 6. When the solenoid valves 21, 22 receive a detection signal from the control circuit 20, the solenoid valves 21, 22 are opened. Then, the compressed air from the air pressure source 24 is supplied to the butterfly valves 5, 6. As a result, the butterfly valves 5, 6 are opened. When the butterfly valves 5, 6 are opened, the powder from the communicating passage 2 is supplied to the powder sprinkling devices 7, 8 via the communicating passages 3, 4.

Further, the control circuit 20 outputs a signal for activating a pump driving spool 23 and for activating the motor 12a of the screw feeder 12. When the pump driving spool 23 is activated, which may be upon receiving a signal from the control circuit 20, the pump driving spool 23 supplies compressed air to the diaphragm pump 13 in order to activate the diaphragm pump 13. Further, when the motor 12a is activated upon receiving a signal from the control circuit 20, the motor 12a rotates the screw 12b of the screw feeder 12 so as to extrude powder from the extrusion port 12c.

Figure 6:
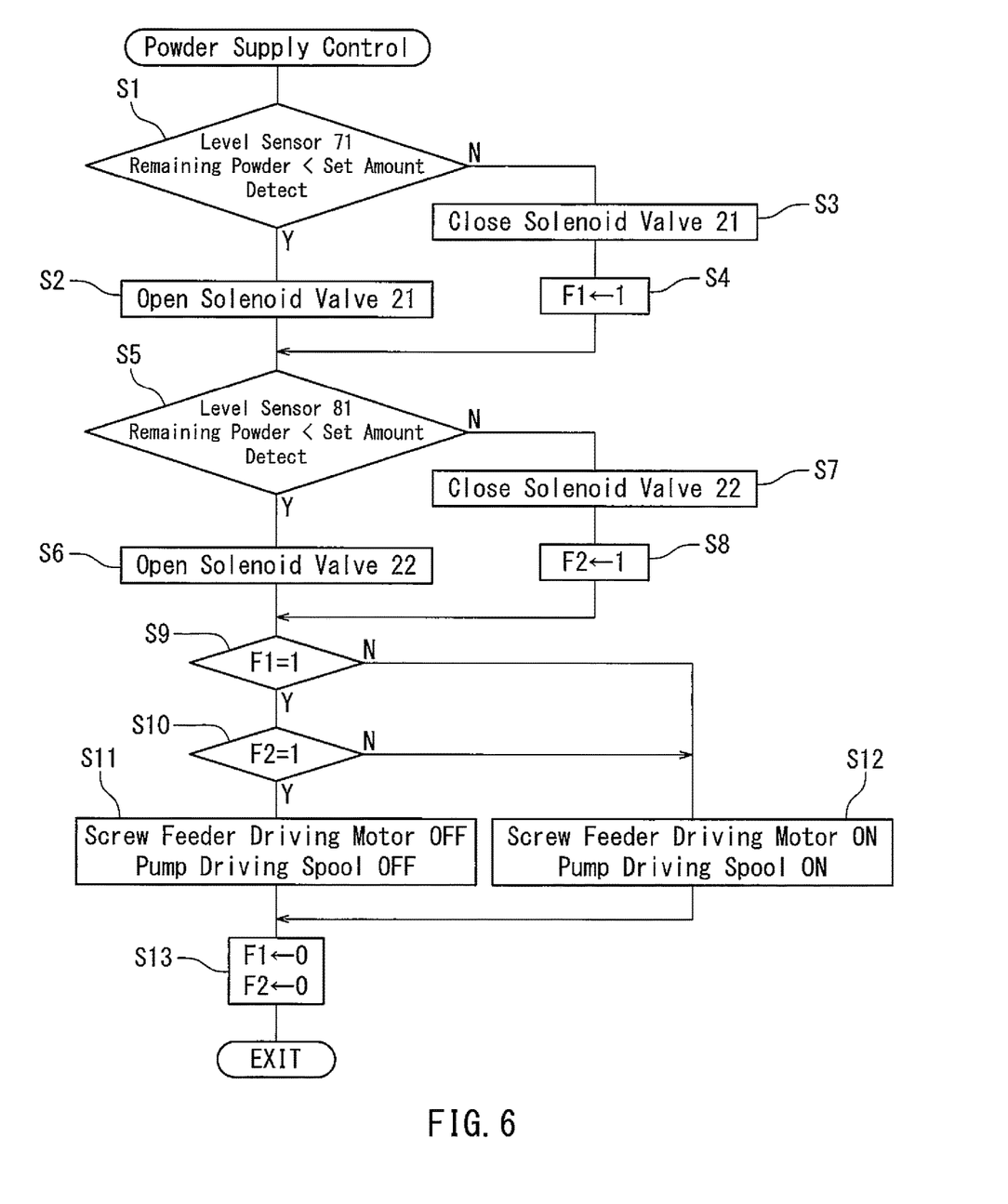
FIG. 6 is a flowchart illustrating a method for operating the control unit in accordance with the first embodiment.

FIG. 6 shows a part of a program contents of the control circuit 20 related to the powder supply apparatus. Hereinafter, the operation of the powder supply apparatus will be described with reference to FIG. 6.

When the control circuit 20 is activated and the control of the powder supply apparatus is started, the detection signals of the level sensors 71, 81 are checked (Step S1, Step S5). If the remaining amount of powder in the powder sprinkling devices 7, 8 is less than a set amount, the level sensors 71, 81 output detection signals (Yes at Step S1, Yes at Step S5). Thereby, the butterfly valves 5, 6 are opened, and the powder is supplied from the communicating passage 2 to the powder sprinkling devices 7, 8. If the remaining amount of powder in the powder sprinkling devices 7, 8 is equal to or greater than a set amount, the corresponding level sensor 71, 81 does not output a detection signal (No at Step S1, No at Step S5). In that case, the control circuit 20 instructs the solenoid valves 21, 22 to close (Step S3, Step S7). Therefore, the butterfly valves 5, 6 are closed. This prevents the powder from being supplied from the communicating passage 2 to the powder sprinkling devices 7, 8. The control circuit 20 stores that the solenoid valves 21, 22 were closed by setting a flag F (Step S4, Step S8).

Further, when either of the level sensors 71, 81 outputs a detection signal, which indicates that the remaining amount of powder in the powder sprinkling devices 7, 8 is less than a set amount (No at Step S9, No at Step S10), the control circuit 20 activates the pump driving spool 23 and the motor 12a (Step S12). The control circuit 20 stores that the operation of the pump driving spool 23 and the motor 12a were activated by setting a flag F (Step S13). On the other hand, when the remaining amount of powder in both of the powder sprinkling devices 7, 8 is equal to or greater than a set amount, both of the level sensors 71, 81 do not output a detection signal (Yes at Step S9, Yes at Step S10). Therefore, the control circuit 20 instructs the pump driving spool 23 and the motor 12a to stop (Step S11).

Accordingly, when the remaining amount of powder in at least one of the powder sprinkling devices 7, 8 becomes less than a set amount, the screw feeder 12 is operated by the motor 12a and the diaphragm pump 13 is operated. Therefore, the powder is sucked into the suction port 131 of the diaphragm pump 13, together with the air, via the air passage 14, and is discharged from the discharge port 13m. Powder is supplied from the discharge port 13m to the powder sprinkling devices 7, 8 through the communicating passage 2 and the communicating passages 3, 4, when the butterfly valves 5, 6 are opened. When the remaining amount of powder in the powder sprinkling devices 7, 8 is more than a set amount, the butterfly valves 5, 6 are closed. Therefore, the operation of the screw feeder 12 and the diaphragm pump 13 are stopped.

In the flowchart of FIG. 6, the processes of Steps S1 to S3 and S5 to S7 correspond to an embodiment of a second control means of the present disclosure. The processes of Steps S4, S8, and S9 to S13 correspond to an embodiment of a third control means of the present disclosure.

Figure 7:
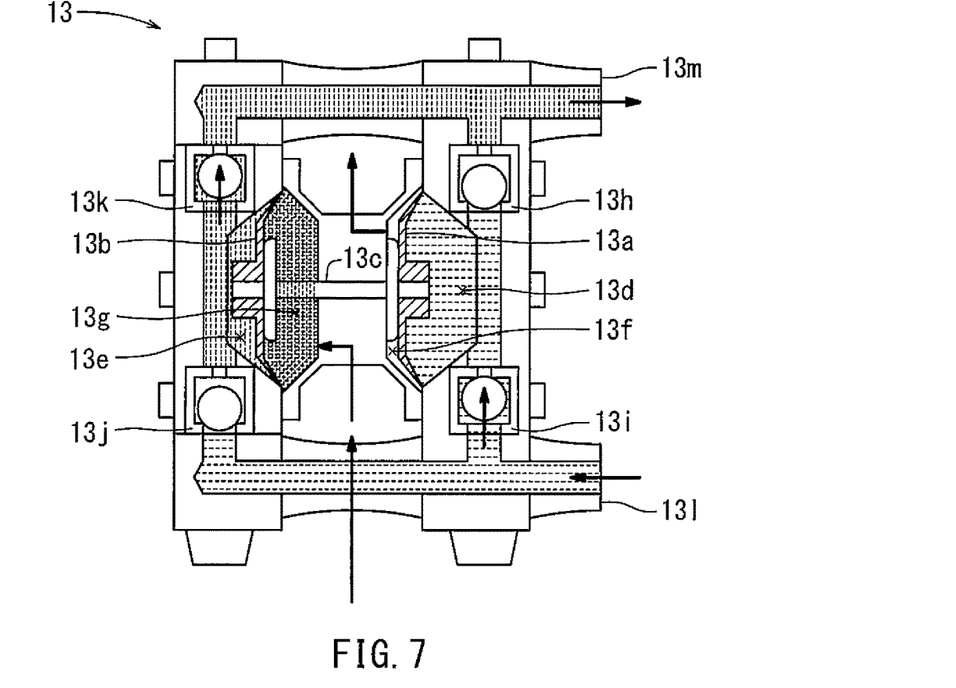
FIG. 7 is an illustration of the operation of a diaphragm pump in the first embodiment.
Figure 8:
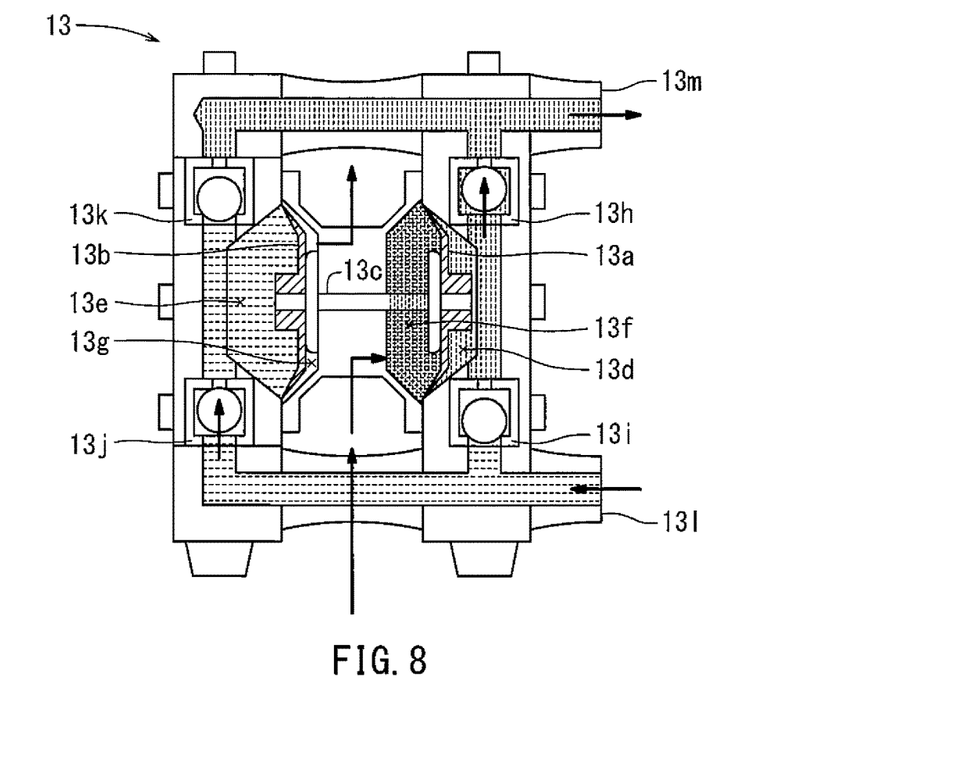
FIG. 8 is an illustration of the operation of the diaphragm pump in the first embodiment.

FIGS. 7 and 8 show an operation of the diaphragm pump 13. FIG. 7 shows a state where the air pressure supplied by the pump driving spool 23 (see FIG. 5) is supplied to an air chamber 13g (on the left side of FIG. 7). When compressed air is supplied to the air chamber 13g, the air in a pump chamber 13e is pushed out toward the discharge port 13m by a diaphragm 13b. Therefore, a check valve 13j is closed, then the air is discharged from the discharge port 13m via a check valve 13k. Since the air contains powder, the powder is discharged, along with the air, from the discharge port 13m.

The diaphragm 13b is connected with a diaphragm 13a by a center rod 13c. Therefore, when the diaphragm 13b pushes out the air from the pump chamber 13e, the diaphragm 13a sucks air into a pump chamber 13d via the suction port 131. At the same time, the air in an air chamber 13f is released into the atmosphere. At this time, a check valve 13h is closed, then air is sucked into the suction port 131 via a check valve 13i. Since the air contains powder, the powder is sucked into the suction port 131 along with the air.

FIG. 8 shows a state where the air pressure supplied by the pump driving spool 23 (see FIG. 5) is supplied to the air chamber 13f, which is on the right side of FIG. 8. When compressed air is supplied to the air chamber 13f, the air in the pump chamber 13d is pushed out toward the discharge port 13m by the diaphragm 13a. At this time, the check valve 13i is closed, then the air is discharged from the discharge port 13m via the check valve 13h. Since the air contains powder, the powder is discharged from the discharge port 13m along with the air.

When the diaphragm 13a pushes out the air in the pump chamber 13d, the diaphragm 13b sucks the air into the pump chamber 13e via the suction port 131. At the same time, the air in the air chamber 13g is released into the atmosphere. At this time, the check valve 13k is closed. The air is sucked into the suction port 131 via the check valve 13j. Since the air contains powder, the powder is sucked into the suction port 131 along with the air.

By repeating the above operation of the pump driving spool 23, the diaphragm pump 13 sucks the powder-air mixture into the suction port 131 and discharges the powder with air from the discharge port 13*m*.

Next, the operation of the screw feeder 12 and the diaphragm pump 13, which may be operated to discharge the powder-air mixture from the discharge port 13*m* of the diaphragm pump 13, will be described.

By operation of the diaphragm pump 13, air is sucked via the atmospheric port 14*a* into the atmospheric passage 14. Further, powder, which is extruded from the extrusion port 12*c* by the operation of the screw feeder 12, reaches the connecting portion 14*e* via the second passage 14*c*. Then the powder is sucked into the suction port 131 of the diaphragm pump 13 due to the air flow from the first passage 14*b* to the third passage 14*d*. The powder sucked into the suction port 131 is carried together with the air by the air pressure along the direction of the air flow in the passage toward the discharge port 13*m* of the diaphragm pump 13. The powder discharged from the discharge port 13*m* of the diaphragm pump 13 to the communicating passage 2 is supplied to the communicating passages 3, 4, via the communicating passage 2, by air pressure. Since the powder is carried through the communicating passages 2, 3, 4 by air pressure in this manner, it is not necessary to make the communicating passages 2, 3, 4 higher than the powder sprinkling devices 7, 8, as is required in the conventional case.

The air flow due to the operation of the diaphragm pump 13 has a substantially continuous flow, but contains some pulsating components due to the characteristics of the pump. Moreover, at the timing when the compressed air is starting to be supplied to the air chambers 13*f*, 13*g* of the diaphragm pump 13, the air pushed out of the pump chambers 13*d*, 13*e* may flowback through the check valves 13*i*, 13*j* and out the inlet port 131 due to a delay in the closing operation of the check valves 13*i*, 13*j*. That is, a phenomenon of backflow from the suction port 131 may occur. When such a backflow phenomenon occurs, the powder in the atmospheric passage 14 may be blown out from the atmospheric port 14*a*.

However, the powder feeder 1 of the present embodiment may suppress such a phenomenon due to the structure of the atmospheric passage 14. First, the diameter of the third passage 14*d* gradually increases from the suction port 131 side toward the connecting portion 14*e* side. Therefore, the pressure of the backflow air is lower at the enlarged diameter portion. Further, the passage central axis 14*g* of the third passage 14*d* is arranged so as to intersect the passage central axes 14*f* of the first passage 14*b* and the second passage 14*c*. Therefore, the powder flowing back through the third passage 14*d* collides with the inner wall surfaces of the first passage 14*b* and the second passage 14*c* in the connecting portion 14*e*. Thereby, the energy flowing toward the atmospheric port 14*a* is weaken. Further, the first passage 14*b* is curved upward from the connecting portion 14*e* toward the atmospheric port 14*a*. Furthermore, the atmospheric port 14*a* is directed upward. Therefore, it is necessary for the powder flowing back in the first passage 14*b* to climb the slope of the inner wall of the first passage 14*b* while passing through the inside of the first passage 14*b*. Thereby, the flow velocity becomes slow. Moreover, since the atmospheric port 14*a* is opened upward, it is difficult for the powder that has flowed back to the vicinity of the atmospheric port 14*a* to fall out of the atmospheric port 14*a*. Furthermore, the passage length of the first passage 14*b* is sufficiently long (longer than the passage length of the second passage 14*c*), and the diameter of the passage gradually increases from the connecting portion 14*e* toward the atmospheric port 14*a*. Therefore, the backflow air pressure decreases while flowing through the first passage 14*b*. As a result, the flow velocity of the powder flowing back in the first passage 14*b* becomes slow while it passes through the first passage 14*b*.

Figure 9:
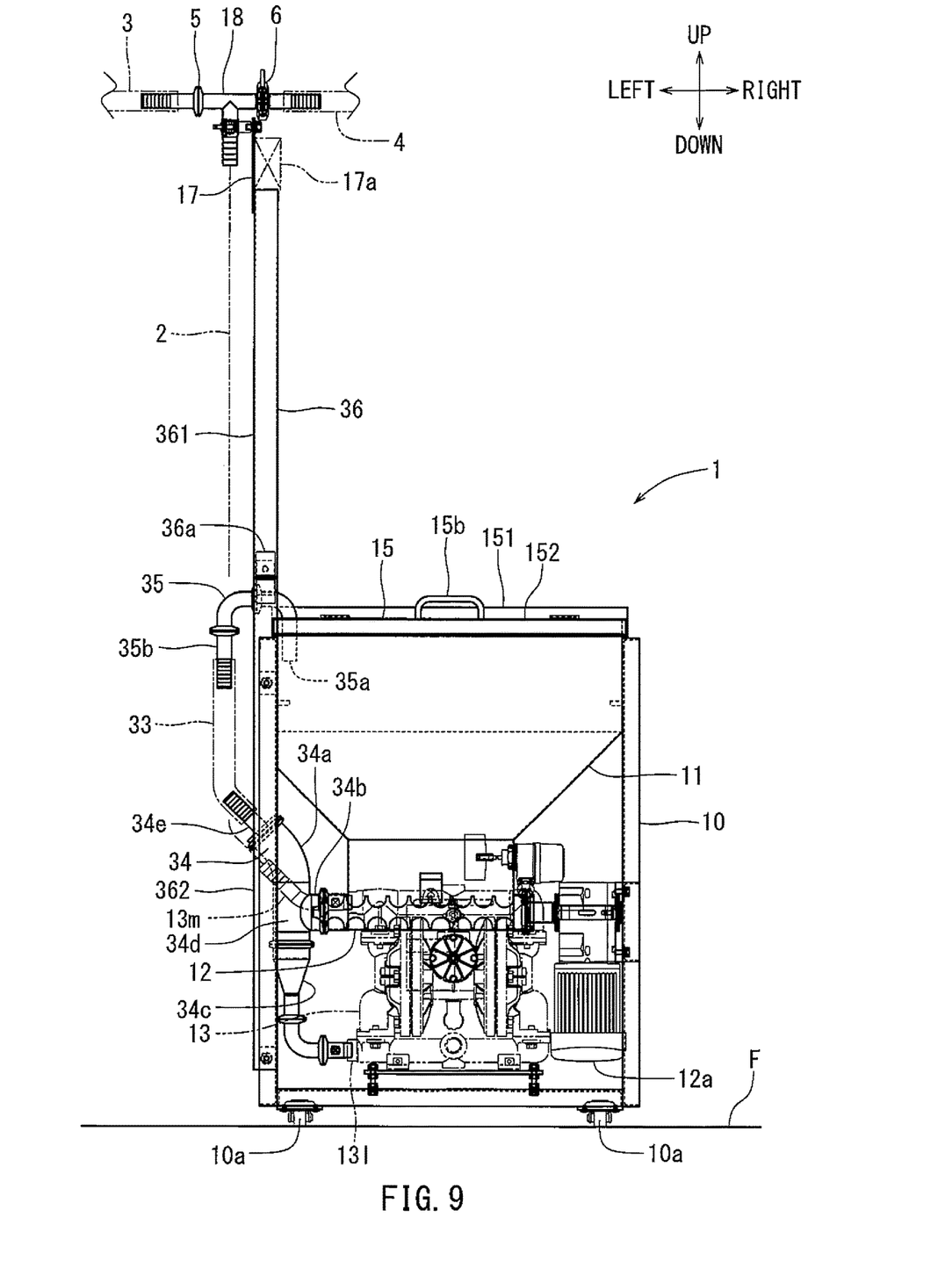
FIG. 9 is a rear perspective view of a second embodiment.
Figure 10:
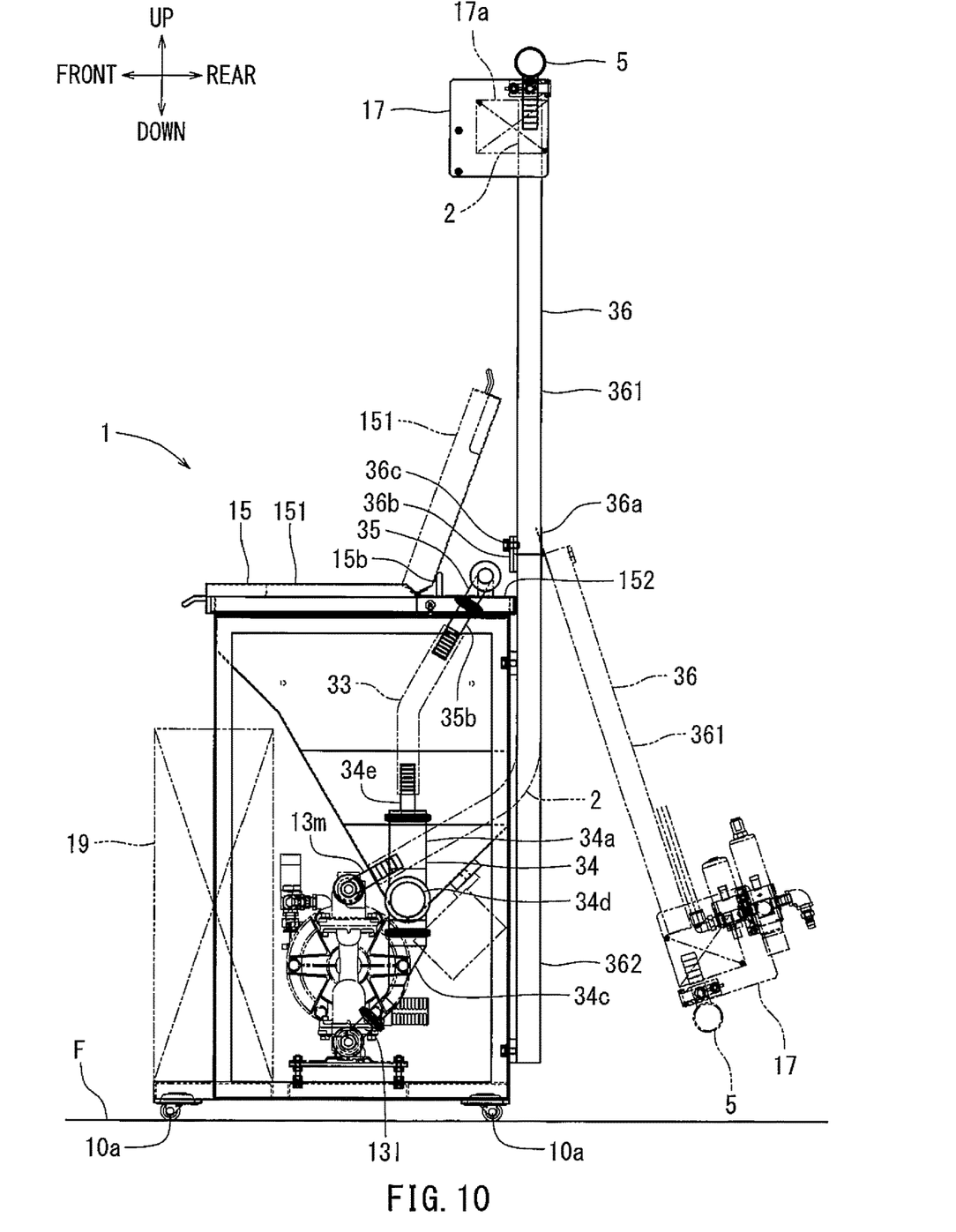
FIG. 10 is a left side view of the second embodiment.

FIGS. 9 and 10 show a second embodiment of the present disclosure. In FIGS. 9 and 10, the front side of the powder feeder 1, when placed on the floor F, is defined as the "front", and each other direction is indicated by arrows. The descriptions of the directions shall be based on these illustrated directions.

In the second embodiment, an atmospheric port 35*a* of an atmospheric passage 34, which corresponds to the atmospheric port 14*a* of the atmospheric passage 14 of the first embodiment, is provided inside the hopper 11. Further, a support column 36, which corresponds to the support column 16 of the first embodiment, is configured to fold, as necessary. Since the other configurations of the second embodiment are substantially the same as those of the first embodiment, the description of the substantially similar parts will be omitted.

In the second embodiment, the passage central axis of a second passage 34*b* (not shown) is configured to intersect with the passage central axis of a first passage 34*a* and a third passage 34*c* at a connecting portion 34*d* (not shown). The diameter of the second passage 34*b* is equal to the inner diameter of the extrusion port 12*c* of the screw feeder 12. The diameter of the first passage 34*a* is equal to the diameter of the second passage 34*b*. On the other hand, in the portion of the third passage 34*c* that connects to the suction port 131 of the diaphragm pump 13, the diameter of the third passage 34*c* is equal to the inner diameter of the suction port 131. The diameter of the third passage 34*c* at the portion that connects to the connecting portion 34*d* is equal to the diameter of the first passage 34*a* and the diameter of the second passage 34*b*. Therefore, the diameter of the third passage 34*c* is configured to gradually increase from the suction port 131 side toward the connecting portion 34*d* side.

A socket 34*e* is integrally provided at the end of the first passage 34*a* (which is the end opposite to the connecting portion 34*d*). Further, a fixing pipe 35 is fixed to the rear lid 152 so as to penetrate the rear lid 152 in the vertical direction. The fixing pipe 35 is curved in a U-shape that is convex upward on the outside of the hopper 11. One end of the fixing pipe 35 works as an atmospheric port 35*a* and is positioned inside the hopper 11. Further, a socket 35*b* is formed at the other end of the fixing pipe 35. The socket 35*b* is in communication with the socket 34*e* of the first passage 34*a* via a connecting pipe 33 at the outside of the hopper 11. Therefore, the first passage 34*a* of the atmospheric passage 34 communicates with the hopper 11 via the connecting pipe 33 and the fixing pipe 35.

Since the atmospheric passage 34 and the atmospheric port 35*a* are configured as described above, the air sucked into the suction port 131 of the diaphragm pump 13 is taken from within the hopper 11. The hopper 11 has a gap to allow air to enter and exit. Therefore, air is sucked from the hopper 11 into the atmospheric port 35*a*. Further, the powder extruded from the extrusion port 12*c* of the screw feeder 12 is sucked into the suction port 131 due to the air flow flowing from the first passage 34*a* to the third passage 34*c* of the atmospheric passage 34. When the backflow of powder and air occurs from the third passage 34*c* toward the first passage 34*a*, the powder and air passes through the first passage 34*a*, the connecting pipe 33, the fixing pipe 35, and the atmospheric port 35*a*, and is then return into the hopper 11. Therefore, it is possible to prevent the powder from being scattered to the outside of the powder feeder 1. The powder returned into the hopper 11 via the atmospheric port 35*a* may leak from a gap in the hopper 11. However, since the gap is immediately closed by the powder flowing through the gap, the amount of powder leaking out is very small.

As shown in FIG. 10, the support column 36 is divided into an upper support column 361 and a lower support column 362 around the center in the vertical direction. The support column 36 holds the support bracket 17, which is fixed to an end of the upper support column 361, at a predetermined height in a state where the upper support column 361 and the lower support column 362 are integrated. The upper support column 361 is rotatably connected to the lower support column 362 by a hinge 36*a*. The upper support column 361 and the lower support column 362 are integrated by fixing a fixing plate 36*b* with a bolt 36*c*. Therefore, by loosening the bolt 36*c* and removing the fixing plate 36*b* from the upper support column 361 and the lower support column 362, the support column 36 is configured to be folded, an embodiment of which is shown by a virtual line in FIG. 10.

Since the powder feeder 1 is configured to fold the upper support column 361 as described above, it becomes easy to move the powder feeder 1

Figure 11:
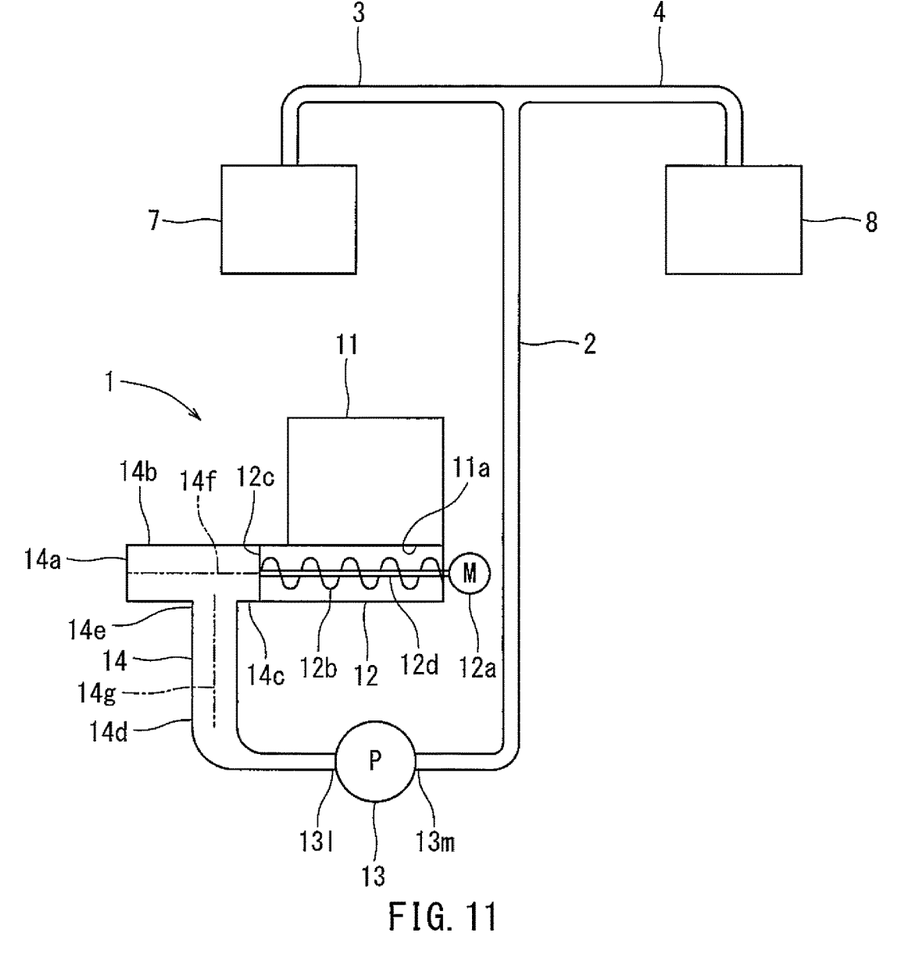
FIG. 11 is a schematic diagram of a third embodiment.
Figure 12:
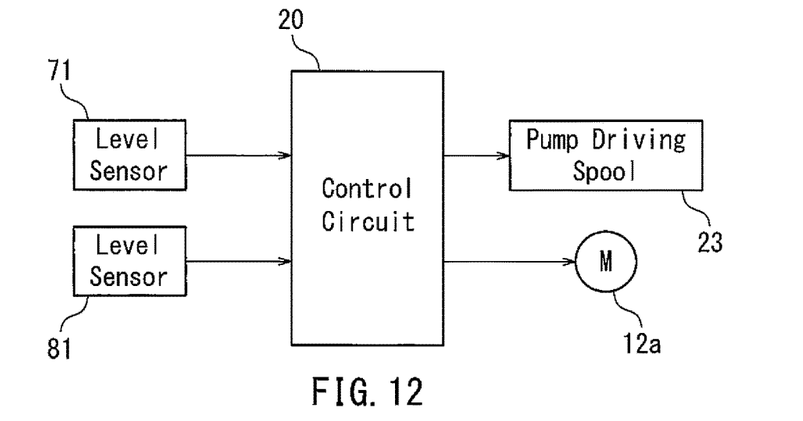
FIG. 12 is a system configuration of the control unit of the third embodiment.
Figure 13:
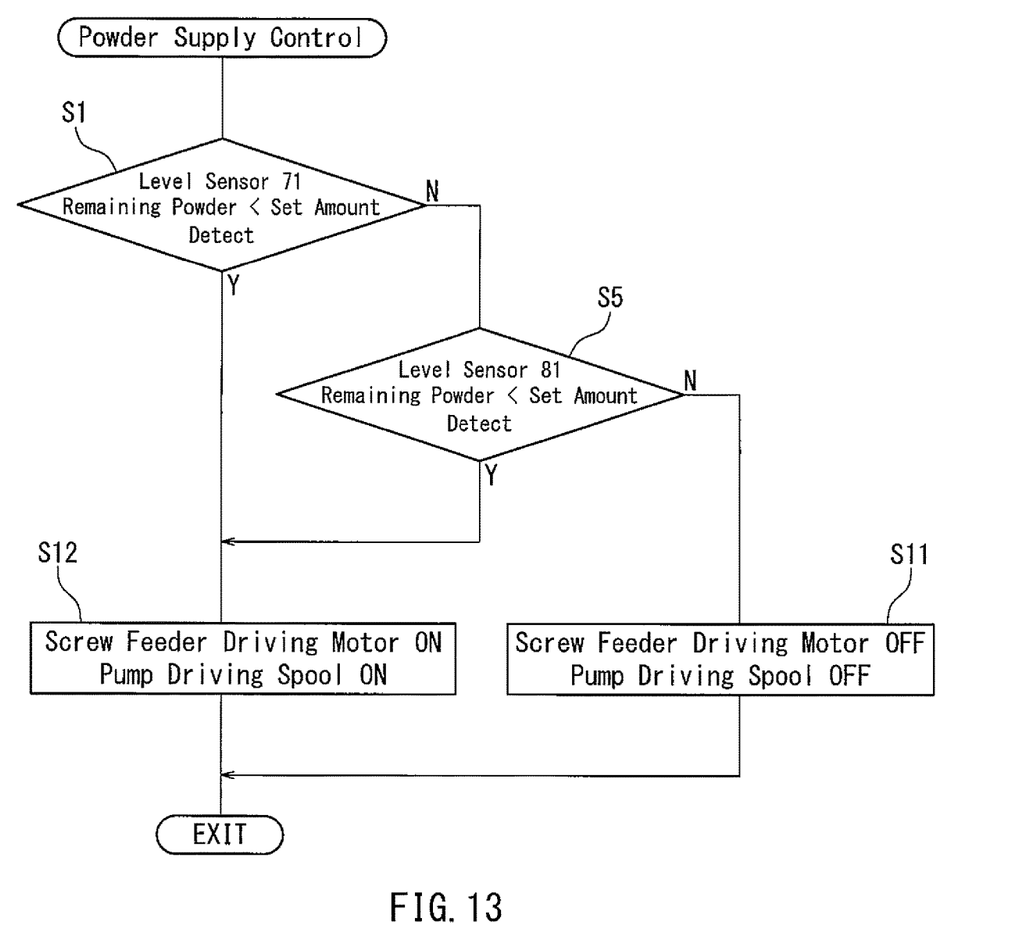
FIG. 13 is a flowchart illustrating a method for operating the control unit in accordance with the third embodiment.

FIGS. 11 to 13 show a third embodiment of the present disclosure. In the third embodiment, the butterfly valves 5, 6 provided in the communicating passages 3, 4 of the first embodiment are not included. Further, the lengths of the communicating passages 3, 4 are substantially the same (in the first embodiment, the lengths of the communicating passages 3 and 4 may be different). Further, the height of the branch path between the communicating passage 2 and the communicating passages 3 and 4 is higher than the powder sprinkling devices 7, 8 (in the first embodiment, the height of the branch path between the communicating passage 2 and the communicating passages 3, 4 may be lower than the powder sprinkling devices 7, 8). As other configurations of the third embodiment are substantially the same as those of the first embodiment, the description of the substantially similar parts will be omitted.

As shown in FIG. 12, the control circuit 20 is not provided with solenoid valves 21, 22, as in the first embodiment, since butterfly valves 5, 6 are not included in the third embodiment. As a result, as shown in FIG. 13, when the control of the powder supply apparatus by the control circuit 20 is started, the amount of powder in the powder sprinkling devices 7, 8 is detected by the level sensors 71, 81 (Step S1, Step S5). When at least one of the level sensors 71, 81 detects that the amount of powder is less than a set amount (Yes at Step S1, Yes at Step S5), the screw feeder driving motor 12*a* and the pump driving spool 23 are activated (Step S12). Then, the powder is pumped out from the discharge port 13*m* of the diaphragm pump 13 by air pressure. The powder is supplied to the powder sprinkling devices 7, 8 through the communicating passage 2, 3, 4. Even if the butterfly valves 5, 6 are not provided, powder sent to the communicating passages 3, 4 are automatically supplied to either or both of the powder sprinkling devices 7, 8, either or both of which have a small amount of powder stored and can accept additional powder.

If neither of the level sensors 71, 81 detect that the amount of powder is less than a set amount (No at Step S1, No at Step S5), the operation of the screw feeder driving motor 12*a* and the pump driving spool 23 are stopped (Step S11). Then, powder being pumped out by air pressure from the discharge port 13*m* of the diaphragm pump 13 is stopped. Since the supply of the powder is stopped, it is possible to prevent the powder, which has no place to go, from clogging in the communicating passages 2, 3, and 4 and from forming a lump.

In the third embodiment, the butterfly valves 5, 6 are not included, and accordingly the solenoid valves 21, 22 are not included. Therefore, the system configuration of the powder supply apparatus can be simplified.

All the processes in the flowchart of FIG. 13 correspond to the first control means of the present disclosure.

Although specific embodiments are described above, the present disclosure is not limited to their appearance and configuration, and various changes, additions, and deletions are possible. For example, in the above embodiment, the powder receiving device is a powder sprinkling device, but the powder receiving device can be of various types, such as one that consumes powder and one that treats powder. Although two powder feeders are provided in the above embodiment, three or more powder feeders may be provided.

In the above embodiment, starch is used as an example of a powder, but the powder may be any of various other powders. Further, in the above embodiment, the level sensors 71, 81 output detection signals when the remaining amount of powder in the hoppers of the powder sprinkling devices 7, 8 becomes less than a set amount. On the other hand, the level sensors 71, and 81 may output a detection signal when the remaining amount of powder in the hoppers of the powder sprinkling devices 7, 8 is larger than a set amount.

A second aspect of the present disclosure is the powder supply apparatus according to a first aspect, wherein the atmospheric passage may include a first passage, a second passage, a third passage, a connecting portion, and an atmospheric port. The connecting portion connects the first passage, the second passage, and the third passage so that they are in communication with each other. The first passage extends from the atmospheric port to the connecting portion. The second passage extends from the extrusion port of the screw feeder to the connecting portion. The third passage extends from the suction port of the diaphragm pump to the connecting portion. At the connecting portion, the third passage is connected so that the passage central axis of the third passage intersects the passage central axes of the first passage and the second passage.

According to the second aspect, the passage central axis of the third passage is connected so as to intersect the passage central axes of the first passage and the second passage. Therefore, even if a slight backflow of air occurs from the suction port of the diaphragm pump, the powder flowing back together with the backflowing air tends to collide with the passage wall surfaces of the first passage and the second passage. As a result, the possibility that the powder is released from the atmospheric port of the first passage may be suppressed.

A third aspect of the present disclosure is the powder supply apparatus according to the second aspect, wherein the inner diameter of the first passage is larger than the inner diameter of the suction port side of the third passage, and the atmospheric port side of the first passage is curved upwardly more than the connecting portion side of the first passage.

According to the third aspect, the diameter of the first passage is larger than the diameter of the suction port side of the third passage. Therefore, when a slight backflow of air occurs from the suction port of the diaphragm pump, the air pressure in the first passage is lower than the air pressure near the suction port. Thereby, the flow velocity of the powder flowing back due to the back air pressure is slowed down. As a result, the possibility that powder is released from the atmospheric port may be suppressed. Moreover, the first passage is curved upward on the atmospheric port side. Therefore, the possibility that powder is released from the atmospheric port may be further suppressed.

A fourth aspect of the present disclosure is the powder supply apparatus according to the first aspect, wherein the atmospheric port opens to the inside the hopper.

According to the fourth aspect, the atmospheric port of the atmospheric passage opens to the inside the hopper. Therefore, when a slight backflow of air occurs from the suction port of the diaphragm pump, the powder that flows back together with the backflowing air is returned to the inside of the hopper via the atmospheric port. As a result, it is possible to prevent the powder from being released to the outside of the hopper.

A fifth aspect of the present disclosure is the powder supply apparatus according to any one of the first to fourth aspect, further including a plurality of powder receiving devices, a control circuit, and a level sensor. The level sensor is installed in each of the plurality of powder receiving devices, and detects whether the powder remaining in the powder receiving device is more or less than a set amount. The control circuit is configured to decide an instruction in response to a detection signal from the level sensor. The control circuit is configured to activate the screw feeder and the diaphragm pump upon receiving the detection signal that the amount of powder remaining in at least one of the powder receiving devices is less than the set amount. On the other hand, the control circuit is configured to deactivate the screw feeder and diaphragm pump upon receiving the detection signal that the amounts of powder remaining in all of the powder receiving devices are greater than the set amount. The communicating passage is branched so as to communicate with each of the plurality of powder receiving devices. The branch path of the communicating passage is positioned higher than the powder receiving device.

According to the fifth aspect, even if there is no open/close valve in the communicating passage, it is possible to automatically supply powder to multiple powder receiving devices at a timing that allows powder to be accepted. Therefore, the configuration of the powder supply apparatus may be simplified by omitting the open/close valve.

A sixth aspect of the present disclosure is the powder supply apparatus according to any one of the first to the fourth aspect, wherein the communicating passage is branched into a plurality of communicating passages to each powder receiving device side so that powder can be supplied to the plurality of powder receiving devices. Each of the plurality of powder receiving devices include the level sensor for detecting whether the remaining amount of powder is greater or smaller than the set amount. Further, on the side of the powder receiving device from the branch path of the communicating passage, an open/close valve for opening and closing each of the communicating passages is provided.

Furthermore, the powder supply device may include a second control means and a third control means. In the second control means, upon receiving a detection signal from each of the level sensors above, the open/close valve corresponding to the powder receiving device which is determined to have a remaining amount of powder less than the set amount is controlled from the closed state to the open state. On the other hand, the open/close valve corresponding to the powder receiving device determined to have a remaining amount of powder greater than the set amount is controlled from the open state to the closed state. In the third control means, when a detection signal is received from each level sensor and it is determined that the amount of powder remaining in at least one of the powder receiving devices is less than the set amount, the screw feeder and diaphragm pump are activated. On the other hand, when it is determined that the amount of powder remaining in all of the powder receiving devices is greater than the set amount, the screw feeder and diaphragm pump are stopped.

According to the sixth aspect, powder may be automatically supplied to the powder receiving device in which the remaining amount of powder is less than the set amount.

The various examples described above in detail with reference to the attached drawings are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved powder supply apparatus, and/or methods of making and using the same.

What is claimed is:

1. A powder supply apparatus, comprising:
   a plurality of powder receiving devices which receive powder;
   a hopper configured to store powder, the hopper having an outlet at a bottom thereof;
   a screw feeder provided at the outlet of the hopper, the screw feeder having an extrusion port, and being configured to push powder received from the outlet of the hopper toward the extrusion port by a screw provided in the screw feeder;
   a diaphragm pump having a suction port and a discharge port, the diaphragm pump being configured to discharge air sucked from the suction port to the discharge port by an operation of a diaphragm;
   an atmospheric passage communicating the suction port of the diaphragm pump with atmosphere;
   a communicating passage communicating the discharge port of the diaphragm pump with the powder receiving device;
   a control circuit; and
   a level sensor installed in each of the plurality of powder receiving devices, each of the level sensors being configured to detect whether the powder remaining in the corresponding powder receiving device is more than, or less than, a set amount;
   wherein:
   the extrusion port of the screw feeder is within the atmospheric passage so as to supply the powder to the atmospheric passage;
   the control circuit is configured to:
   activate the screw feeder and the diaphragm pump upon receiving a detection signal that the amount of powder remaining in at least one of the powder receiving devices is less than the set amount; and
   deactivate the screw feeder and diaphragm pump upon receiving a detection signal that the amounts of powder remaining in all of the powder receiving devices are greater than the set amount.

2. The powder supply apparatus according to claim 1, wherein the atmospheric passage comprises:
   a first passage;
   a second passage;
   a third passage;

a connecting portion connecting the first passage, the second passage, and the third passage so that they are in communication with each other; and an atmospheric port, wherein:

the first passage extends from the atmospheric port to the connecting portion;

the second passage extends from the extrusion port of the screw feeder to the connecting portion;

the third passage extends from the suction port of the diaphragm pump to the connecting portion; and at the connecting portion, the third passage is connected so that a passage central axis of the third passage intersects a passage central axis of the first passage and intersects a passage central axis of the second passage.

3. The powder supply apparatus according to claim 2, wherein:

an inner diameter of the first passage is larger than an inner diameter of a suction port side of the third passage; and an atmospheric port side of the first passage is curved upwardly more than a connecting portion side of the first passage.

4. The powder supply apparatus according to claim 2, wherein the atmospheric port opens to an inside of the hopper.

5. The powder supply apparatus according to claim 1, wherein:

the communicating passage is branched so as to communicate with each of the plurality of powder receiving devices; and the branch path of the communicating passage is positioned higher than the powder receiving device in a direction of gravity.

* * * * *